(12) United States Patent
Canard et al.

(10) Patent No.: US 11,483,146 B2
(45) Date of Patent: Oct. 25, 2022

(54) TECHNIQUE FOR PROTECTING A CRYPTOGRAPHIC KEY BY MEANS OF A USER PASSWORD

(71) Applicant: ORANGE, Issy-les-Moulineaux (FR)

(72) Inventors: Sebastien Canard, Chatillon (FR); Nicolas Desmoulins, Chatillon (FR); Marie Paindavoine, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 6 days.

(21) Appl. No.: 16/772,478

(22) PCT Filed: Dec. 12, 2018

(86) PCT No.: PCT/FR2018/053233
§ 371 (c)(1),
(2) Date: Jun. 12, 2020

(87) PCT Pub. No.: WO2019/115943
PCT Pub. Date: Jun. 20, 2019

(65) Prior Publication Data
US 2020/0389302 A1   Dec. 10, 2020

(30) Foreign Application Priority Data
Dec. 15, 2017   (FR) ...................................... 1762283

(51) Int. Cl.
*H04L 9/06* (2006.01)
*H04L 9/08* (2006.01)
(Continued)

(52) U.S. Cl.
CPC .......... *H04L 9/0863* (2013.01); *H04L 9/0618* (2013.01); *H04L 9/0822* (2013.01);
(Continued)

(58) Field of Classification Search
CPC ... H04L 9/0863; H04L 9/0618; H04L 9/0822; H04L 9/0894; H04L 9/30; H04L 9/3218;
(Continued)

(56) References Cited

U.S. PATENT DOCUMENTS 9,634,999 B1 *   4/2017   Marion ................... G06F 21/64
2008/0049939 A1 *   2/2008   Canetti ................. H04L 9/0863
380/277

(Continued)

FOREIGN PATENT DOCUMENTS

WO   2015070160 A1   5/2015

OTHER PUBLICATIONS

International Search Report dated Jan. 28, 2019 for corresponding International Application No. PCT/FR2018/053233, filed Dec. 12, 2018.

(Continued)

*Primary Examiner* — Darshan I Dhruv
(74) *Attorney, Agent, or Firm* — David D. Brush; Westman, Champlin & Koehler, P.A.

(57) ABSTRACT

A technique for protecting a cryptographic key. A user has an identifier and an associated password. The first cryptographic key is designed to decrypt a piece of encrypted data. The user device generates a second cryptographic key by applying a key derivation algorithm to at least the password, then encrypts the first cryptographic key by applying an encryption algorithm parameterized by the second cryptographic key. The user device then provides the encryption of the first cryptographic key to a management device for storage. A response associated with a question is obtained from the user. The user device calculates a result of an application of a function to at least one response associated with a question, then provides a value dependent on the result to a management device for storage. The value then (Continued)

enables the user device to determine the password when it has the response to the corresponding question.

20 Claims, 2 Drawing Sheets

(51) Int. Cl.
    *H04L 9/12*     (2006.01)
    *H04L 9/30*     (2006.01)
    *G06F 21/00*     (2013.01)
    *H04L 9/32*     (2006.01)

(52) U.S. Cl.
    CPC .............. *H04L 9/0894* (2013.01); *H04L 9/30* (2013.01); *H04L 9/3218* (2013.01); *H04L 9/3226* (2013.01); *H04L 9/3271* (2013.01); *G06F 2221/2103* (2013.01); *G06F 2221/2131* (2013.01)

(58) Field of Classification Search
    CPC ................... H04L 9/322; H04L 9/3221; G06F 2221/2103; G06F 2221/2131
    See application file for complete search history.

(56) References Cited

U.S. PATENT DOCUMENTS

| | | | | |
|---|---|---|---|---|
| 2008/0313473 | A1* | 12/2008 | Provencher | G06F 21/554 713/193 |
| 2010/0037050 | A1* | 2/2010 | Karul | H04L 63/0428 713/167 |
| 2011/0060903 | A1* | 3/2011 | Yoshida | H04L 9/3218 713/155 |
| 2013/0212393 | A1* | 8/2013 | D'Souza | H04L 9/0891 713/171 |
| 2014/0140508 | A1* | 5/2014 | Kamath | H04L 9/0822 380/255 |
| 2015/0134962 | A1* | 5/2015 | Mahajan | H04L 63/061 713/171 |
| 2015/0304315 | A1* | 10/2015 | Estehghari | H04L 63/045 713/156 |
| 2016/0241398 | A1* | 8/2016 | Lewis | H04L 9/3234 |
| 2017/0142082 | A1* | 5/2017 | Qian | H04L 63/0442 |
| 2017/0250979 | A1* | 8/2017 | Benson | H04L 63/08 |
| 2018/0013562 | A1* | 1/2018 | Haider | H04L 63/06 |
| 2018/0288033 | A1* | 10/2018 | Kamal | G06Q 20/38215 |

OTHER PUBLICATIONS

Written Opinion of the International Searching Authority dated Jan. 28, 2019 for corresponding International Application No. PCT/FR2018/053233, filed Dec. 12, 2018.

English translation of the Written Opinion of the International Searching Authority dated Jun. 16, 2020 for corresponding International Application No. PCT/FR2018/053233, filed Dec. 12, 2018.

A. Boldyreva et al., "On notions of Security for Deterministic Encryption, and Efficient Constructions with Random Oracles", Article published in the CRYPTO 2008 conference proceedings, pp. 335-359.

* cited by examiner

TECHNIQUE FOR PROTECTING A CRYPTOGRAPHIC KEY BY MEANS OF A USER PASSWORD

CROSS-REFERENCE TO RELATED APPLICATIONS

This application is a Section 371 National Stage Application of International Application No. PCT/FR2018/053233, filed Dec. 12, 2018, the content of which is incorporated herein by reference in its entirety, and published as WO 2019/115943 on Jun. 20, 2019, not in English.

FIELD OF THE DISCLOSURE

The present invention relates to the field of the security of services, and more precisely to the field of protecting a user's data, called sensitive data.

BACKGROUND OF THE DISCLOSURE

It is common to protect a user's data by way of a cryptographic encryption system. Such a system provides one or more cryptographic keys with which it is possible to encrypt an item of data in order to protect it, and then to decrypt the ciphertext in order to recover it in plaintext. In a secret key cryptography system, the key used to encrypt the item of data is the same as the key used to decrypt it. It is understood that this single key is extremely sensitive and should be protected. In a public key cryptography system, the key used to encrypt the item of data is public and known to all, whereas the key used for decryption, called a private key, is sensitive and should also be protected.

A decryption key, whether this be a secret key of a symmetric encryption system or a private key of an asymmetric encryption system, is usually several hundred bits. It is therefore complicated for a user to memorize it. However, due to its sensitivity, it is common to secure access to this decryption key.

One known example of securing access to a decryption key is based on using an identifier, or login, and a password that are specific to a user and easily able to be memorized by said user. It is thus known to deterministically generate and regenerate a cryptographic key, such as the decryption key mentioned above, by applying a key derivation algorithm, for example PBKDF2 ("Password-Based Key Derivation Function 2") to the user's login and password. The user thus only has to memorize his login and his password in order to regenerate his decryption key and access his data in plaintext on demand.

In a second known example, the user's decryption key is encrypted by way of a cryptographic algorithm and a second cryptographic key. In one particular embodiment, the encrypted decryption key thus obtained is stored on a remote server. Securing access to the user's decryption key then amounts to protecting access to this second cryptographic key, which may be achieved for example using the method described above, that is to say by way of a login and a password that are known to the user.

If a sensitive item of data such as a decryption key is protected through knowledge of a login and a password, then it is necessary to be able to manage cases in which the user wishes to change his password, or simply manage the loss of the password by the user while still ensuring the continuity of the decryption key intended for securely accessing the user's sensitive data previously stored in ciphertext.

In a case in which the login and the password are used to generate an initial decryption key, used to decrypt the user's sensitive data that are encrypted by way of an associated initial encryption key, then changing the password causes the generation of a new decryption key, different from the initial decryption key. This new decryption key is therefore not suitable for decrypting the data previously encrypted and intended to be decrypted by way of the initial decryption key. In order to avoid this situation, it is common to entrust the initial decryption key to a third party, from which said key may be recovered in order to access sensitive data encrypted by way of the initial encryption key. In the same way, losing the password requires a third party to provide the lost password or the initial decryption key. This mechanism, implemented involving a third party, is better known under the name key escrow. However, this third party has all of the information allowing it to access the user's sensitive data. Total confidentiality of the user's data is therefore not guaranteed.

If a second cryptographic key is used to protect the decryption key and this other key is protected by way of a login and a password, forgetting or losing the password does not allow the other key to be recovered, unless it is encrypted by way of an item of data also known to a third party. However, in this case as well, complete confidentiality of the user's sensitive data is not guaranteed.

Thus, changing or losing a password used to protect access to a cryptographic key ultimately requires a third party to have knowledge of the cryptographic key and/or of the password and therefore potentially to have access to the user's sensitive data.

SUMMARY

One of the aims of the invention is to remedy inadequacies/drawbacks of the prior art and/or to make improvements thereto.

According to a first aspect, what is proposed is a method for protecting a first cryptographic key, a user having an identifier and an associated password. This first cryptographic key is intended to decrypt at least one ciphertext. This method, implemented by a user device, comprises:
  generating a second cryptographic key by applying a key derivation algorithm to at least the password;
  encrypting the first cryptographic key by applying an encryption algorithm parameterized by the second cryptographic key;
  calculating the result of the application of a function to at least one answer associated with a question, the answer being obtained from the user;
  providing the ciphertext of said first cryptographic key and at least one value dependent on said result to the management device for storage, said value allowing the user device to determine the password when it has the answer to said question.

At this stage, the user is thus registered with the management device. The client process is highly simple and secure for the user, since nothing is stored on the user device: the user only has to remember his identifier and his password and be able to answer one or more personal questions. In addition, the management device does not store any data enabling it to obtain the cryptographic key in order to access the user's sensitive data.

The management device may be a server or else a security element, for example a chip card.

In a first particular embodiment, the result corresponds to a third cryptographic key generated by applying a key derivation algorithm to said answer and the value dependent on said result corresponds to the encryption of the password by way of the generated third cryptographic key.

The value that is stored by the management device is thus protected and cannot be accessed by the management device.

In one variant embodiment, the result corresponds to a third cryptographic key generated by applying a key derivation algorithm to this answer and to the corresponding question and the value dependent on said result corresponds to the encryption of the password by way of the generated cryptographic key.

According to one particular feature, the protection method comprises, in order to determine the password from an answer obtained by the user device for said question:
the user device obtaining said ciphertext of the password and the corresponding question;
calculating a fourth cryptographic key by applying the key derivation algorithm to the question and to the answer obtained from the user;
calculating a current password by applying the decryption algorithm corresponding to the encryption algorithm parameterized by the calculated fourth cryptographic key to the ciphertext of the obtained password.

The user device is thus able to retrieve the password in the event of the user losing or forgetting it.

In a second particular embodiment, the function is an (n−1)th-degree polynomial, n being greater than or equal to two, n corresponding to a number of questions to be asked to the user in order to determine the password, said polynomial taking the value of the password at zero and the value dependent on said result corresponds to said result.

The user thus has to know a set of answers to questions so that the user device is able to determine the current password. Just one answer is not enough. This answer could be found by a malicious third party by analyzing data available on social networks disclosed by the user. This second embodiment is more secure since the user must answer n questions correctly, the polynomial being chosen to be of degree (n−1). In this second embodiment, in order to determine the password, the user device determines the polynomial from n values stored by the management device and from n answers to the questions, obtained from the user. The password then corresponds to the value taken by the polynomial at zero.

In a third particular embodiment, the function is a bijective (n−1)th-degree polynomial, n being greater than or equal to two, n corresponding to a number of questions to be asked to the user in order to determine the password, the value dependent on said result corresponds to said result and the user device furthermore provides the result of the application of the function to the password to the management device for storage.

This third embodiment has the same advantages as the second embodiment, while still simplifying the management of the password change. Specifically, the values stored by the management device are not changed when a password is changed. Only the value taken by the polynomial at zero is changed.

In this third embodiment, in order to determine the password, the user device determines the polynomial from n values stored by the management device and from n answers to the questions, obtained from the user. The password is then determined by applying the inverse polynomial to the value taken by the polynomial at zero provided at registration.

In these various particular embodiments, the protection method furthermore comprises:
the user device obtaining the ciphertext of the first cryptographic key from the management device;
the user device regenerating the second cryptographic key by applying the key derivation algorithm to at least the password provided by the user;
regenerating the first cryptographic key by applying the decryption algorithm corresponding to the encryption algorithm parameterized by the second cryptographic key to the ciphertext of the first cryptographic key.

The user device thus easily regenerates the first cryptographic key without the management device having been able to access it.

According to one particular feature, the protection method comprises verifying the integrity of the regenerated first cryptographic key by way of a public key associated with the first cryptographic key stored in association with the ciphertext of said first cryptographic key.

According to one alternative particular feature, the protection method comprises verifying the integrity of the regenerated first cryptographic key by way of a ciphertext of the user's identifier through said first cryptographic key stored in association with the ciphertext of said first cryptographic key.

In these various particular embodiments, the method comprises, in order to change the password:
the user device generating a fifth cryptographic key by applying the key derivation algorithm to at least one new password;
the user device calculating a new ciphertext of the first cryptographic key by applying the encryption algorithm parameterized by the fifth cryptographic key to the first cryptographic key;
storing said new ciphertext of the first cryptographic key.

It is thus easy to change the password.

According to one particular feature, a proof of knowledge is stored in association with the ciphertext of the first cryptographic key and said proof of knowledge is verified before said new ciphertext of the first cryptographic key is stored.

This bolsters the security of the method when the password is changed.

According to a second aspect, what is proposed is a user device intended to be used by a user having an identifier and an associated password, a first cryptographic key being intended to decrypt at least one ciphertext. This user device comprises:
a module for generating a second cryptographic key by applying a key derivation algorithm to at least the password;
a module for encrypting the first cryptographic key by applying an encryption algorithm parameterized by the second cryptographic key;
a calculation module, designed to calculate a result of the application of a function to at least one answer associated with a question, the answer being obtained from the user;
a provision module, designed to provide the ciphertext of said first cryptographic key and at least one value dependent on said result to the management device for storage, said value allowing the user device to determine the password when it has the answer to said question.

The advantages stated in respect of the protection method according to the first aspect are able to be transposed directly to the user device.

This user device may of course include, in structural terms, the various features relating to the protection method as described above, which features may be combined or taken individually.

According to a third aspect, what is proposed is a program for a user device, on a data medium and able to be loaded in the memory of a user device, comprising program code instructions intended to command the execution of the steps of the above-described protection method that are implemented by the user device when this program is executed by this device and a recording medium able to be read by a device and on which a program for a device is recorded.

The advantages stated in respect of the protection method according to the first aspect are able to be transposed directly to the program for a user device and to the recording medium.

According to a fourth aspect, what is proposed is a management device comprising:
- an obtainment module, designed to obtain a ciphertext of a first cryptographic key and a value dependent on a result calculated by the user device from a user device for storage in association with an identifier of a user, this value allowing the user device to determine the password when it has the answer to a question;
- a storage memory, designed to store data obtained from a user device.

The advantages stated in respect of the protection method according to the first aspect are able to be transposed directly to the management device.

This management device may of course include, in structural terms, the various features relating to the protection method as described above, which features may be combined or taken individually.

According to a fifth aspect, what is proposed is a program for a management device, on a data medium and able to be loaded in the memory of a management device, comprising program code instructions intended to command the execution of those steps of the above-described protection method that are implemented by the management device when this program is executed by this device and a recording medium able to be read by a device and on which a program for a device is recorded.

The advantages stated in respect of the protection method according to the first aspect are able to be transposed directly to the program for a management device and to the recording medium.

According to a sixth aspect, what is proposed is a system for protecting a first cryptographic key comprising a management device according to the fourth aspect and a user device according to the second aspect.

The advantages stated in respect of the protection method according to the first aspect are able to be transposed directly to the protection system.

BRIEF DESCRIPTION OF THE DRAWINGS

The technique for protecting a cryptographic key by way of a user password will be better understood with the aid of the following description of particular embodiments, with reference to the appended drawings, in which.

DETAILED DESCRIPTION OF ILLUSTRATIVE EMBODIMENTS

The steps of a method for protecting a cryptographic key by way of a user password will now be described with reference to FIGS. 1a, 1b, 1c and 1d.

It is assumed that a user has a cryptographic key, said to be sensitive, denoted sk, intended to be used to decrypt data that are specific to the user, called sensitive data. This cryptographic key is a sensitive key in the sense that its disclosure allows a person who has obtained it to access all of the user's sensitive data that were previously encrypted. The user is equipped with a device such as a personal computer, a mobile terminal, etc. For the sake of simplification, in the remainder of the description, the device and the user are associated and this device controlled by the user is called "user device".

In the exemplary embodiment described here, it is assumed that the sensitive cryptographic key sk is used in a public key cryptography system, for example RSA (for "Rivest Shamir and Adleman") In this case, the sensitive cryptographic key sk is a private key, or decryption key, of a public key/private key pair, intended to be used to decrypt sensitive content. The sensitive content is encrypted by way of the associated public key, denoted pk. These keys were generated by way of a key generation algorithm and comply with a relationship denoted PKGen. Thus, pk=PKGen(sk). It should be noted that a public key encryption system is usually used to manage what are called long-term keys. This system is therefore well suited to the case of use described here.

However, the method described here also applies to a case in which the sensitive cryptographic key is used in a secret key cryptographic system.

It is assumed that the user is associated with a pair comprising an identifier login and a password pwd that only he knows. It is also assumed that the user is associated with a set of l personal questions $q_i$ and of l associated answers $a_i$, $i \in [1, l]$, l being greater than or equal to one, which only he knows. Examples include the maiden name of his mother, the name of his childhood pet, etc.

The protection method implemented by the user device and by a management device is described in a first embodiment.

Figure 1A:
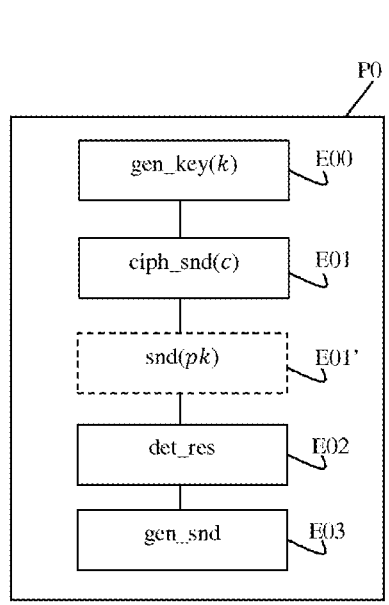
FIGS. 1a, 1b, 1c and 1d show steps of various phases of a method for protecting a cryptographic key by way of a user password, according to one exemplary embodiment.

In an initial registration phase P0, illustrated by FIG. 1a, the user registers with a server S, called management device, so that the latter protects his sensitive cryptographic key sk, while still managing changes to or even losses of the user's password. The user and therefore the user device is identified with the server S by his identifier login; however, the server S does not know the user's password pwd.

First of all, the user's sensitive cryptographic key sk is encrypted by the user device by way of a second cryptographic key denoted k, derived from the user's password and login by way of a key derivation function, for example PBKDF2 (for "Password-Based Key Derivation Function 2").

In an initial key generation step E00, the second cryptographic key k is generated by the user device by applying a key derivation algorithm to the user's identifier login and password pwd. For example, k=PBKDF2(login∥pwd), where the operator '∥' represents concatenation.

In a following encryption and sending step E01, the user's sensitive cryptographic key sk is encrypted by the user device by way of the second cryptographic key k generated in the previous step E00. For example, the AES ("Advanced Encryption Standard") secret key cryptography algorithm, parameterized by the second cryptographic key k, is applied to the user's sensitive cryptographic key sk in order to obtain the ciphertext of the sensitive cryptographic key, denoted c. Thus, c=AESEnc(k, sk). At the end of step E01, the user device sends the ciphertext of the sensitive cryptographic key c to the server S for storage in association with the user's identifier login.

In an optional step E01', shown in dotted lines in FIG. 1a, the user device also sends the public key pk to the server S, which stores it in association with the identifier login. Sending the public key pk is intended to allow the user device to verify the integrity of the sensitive cryptographic key sk when it is regenerated. This thus prevents the user device from storing the public key pk.

In a step E02, the user device calculates a result of the application of a function to at least one answer $a_i$ associated with a question $q_i$. In this first embodiment, the result corresponds to a cryptographic key generated by applying a key derivation algorithm to the answer $a_i$ and to the corresponding question $q_i$. More precisely, for each of the pairs of personal questions and associated answers $(q_i, a_i)$, a cryptographic key associated with the question $q_i$ and with the answer $a_i$ is generated using a key generation algorithm such as the one used in step E00. The key associated with the pair i is denoted $k_i$. Thus, for each i∈[1, l], $k_i$=PBKDF2(login∥$q_i$∥$a_i$). There is no limitation attached to the key generation algorithm used in this step, with an algorithm different from the one in step E00 possibly being used.

In a following step E03, the user device provides at least one value dependent on the result to the server S for storage. More precisely, in this first embodiment, the user device encrypts the user's password pwd for each generated key $k_i$ associated with the pair i formed of the question $q_i$ and the associated answer $a_i$. It is possible for example, as in step E01, to use the AES algorithm. The ciphertexts of the password pwd that are obtained are denoted $c_i$. Thus, $c_i$=AESEnc($k_i$,pwd). The ciphertexts $c_i$ of the password pwd are then sent to the server S, which stores them in association with the identifier login. There is no limitation attached to the encryption algorithm used in this step, with an algorithm different from the one in step E01 possibly being used.

Thus, at the end of steps E00 to E03, in this first embodiment, the server S stores, in association with the user's identifier login, the ciphertext c of the user's sensitive cryptographic key sk, the ciphertexts $c_i$ obtained by encrypting the user's password pwd by way of each key $k_i$ associated with the pair $(q_i, a_i)$ and optionally the public key pk. The ciphertexts $c_i$, as described later on, allow the user device to determine the password based on an answer to a question asked to the user.

In one variant implementation of the first embodiment, in step E02, the user device calculates a result of the application of a function to at least one answer $a_i$ associated with a question $q_i$. In this variant, the result corresponds to a cryptographic key generated by applying a key derivation algorithm to the answer $a_i$. More precisely, for each of the answers $a_i$, a cryptographic key associated with the answer $a_i$ is generated using a key generation algorithm, for example the one used in step E00. The key associated with the pair i is denoted $k_i$. Thus, for each i∈[1,l], $k_i$=PBKDF2 (login∥$a_i$). There is no limitation attached to the key generation algorithm used in this step, with an algorithm different from the one in step E00 possibly being used.

In step E03, the user device encrypts the user's password pwd for each generated key $k_i$ associated with the answer $a_i$. The ciphertexts $c_i$ of the password pwd are then sent to the server S, which stores them in association with the identifier login.

Thus, at the end of steps E00 to E03, in this variant of the first embodiment, the server S stores, in association with the user's identifier login, the ciphertext c of the user's sensitive cryptographic key sk, the ciphertexts $c_i$ obtained by encrypting the user's password pwd by way of each key $k_i$ associated with an answer $a_i$ and optionally the public key pk. The ciphertexts $c_i$, as described later on, allow the user device to determine the password based on an answer to a question asked to the user.

In one particular embodiment, when the user's sensitive cryptographic key is used in a secret key encryption system, in step E01', the user device determines a deterministic ciphertext $\tilde{c}$ of the identifier login using the sensitive cryptographic key sk, denoted $\tilde{c}$=DetEnc(sk, login), and then sends the ciphertext $\tilde{c}$ to the server S, which stores it in association with the identifier login. The sending of a ciphertext $\tilde{c}$ is intended to allow the user device to verify the integrity of the sensitive cryptographic key sk when it is regenerated. Thus, at the end of steps E00 to E03, the server S stores, in association with the user's identifier login, the ciphertext c of the user's sensitive cryptographic key sk, the ciphertexts $c_i$ obtained by encrypting the user's password pwd by way of each key $k_i$ associated with the answers $a_i$ and, where applicable, with the corresponding questions $q_i$ and optionally the ciphertext $\tilde{c}$.

It is emphasized that the user only memorizes his identifier login and his password pwd. He also knows the answers to the personal questions. He does not have to memorize a sensitive key such as his sensitive cryptographic key sk, the second cryptographic key k or all of the keys $k_i$ associated with the answers $a_i$ and, where applicable, with the corresponding questions $q_i$. The user device also does not store them.

It is also emphasized that the server S stores protected or encrypted data. Since it does not hold the key k used to encrypt the user's sensitive cryptographic key sk, this key k having been generated and used on the user device, the server S is therefore unable to recover the user's sensitive cryptographic key sk and to access the user's sensitive data protected by this key sk. In addition, the server S is unable to recover keys $k_i$ associated with the answers $a_i$ and, where applicable, with the corresponding questions $q_i$, and is therefore not able to obtain the password pwd.

As described above, the ciphertext of the sensitive cryptographic key c and the ciphertexts $c_i$ of the password pwd are sent to the server S in two different steps (E01 and E03) for storage in association with the user's identifier login. It is understood that this is merely an exemplary embodiment and that the user device may also send the ciphertext of the sensitive cryptographic key c and the ciphertexts $c_i$ of the password pwd to the server S in one go in step E03 for storage in association with the user's identifier login.

Figure 1B:
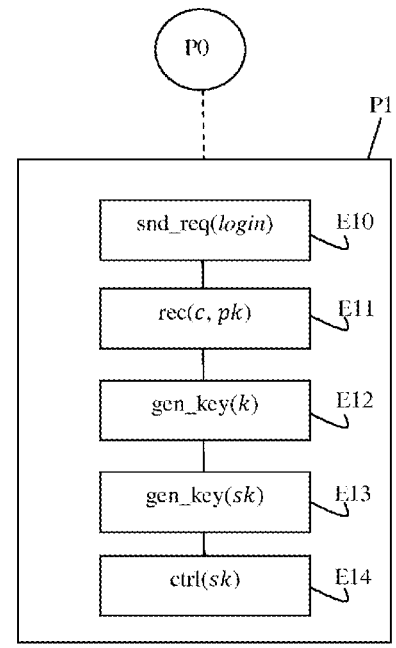

In a following phase P1 of recovering the user's sensitive cryptographic key, illustrated by FIG. 1b, the user device recovers the sensitive cryptographic key sk in order to use this key to access the user's data in open form.

More precisely, in a step E10 of sending a request, the user device sends a request to obtain the ciphertext of the sensitive cryptographic key c to the server S, this request comprising his identifier login.

In a following answering step E11, the server S sends the ciphertext of the sensitive cryptographic key c and optionally the public key pk associated with the sensitive cryptographic key sk to the user device.

In a following step E12 of obtaining the second cryptographic key, the user device regenerates the second cryptographic key k by applying the key derivation algorithm used in step E00, in this case PBKDF2, to his identifier login and to his password pwd. Thus, k=PBKDF2(login∥pwd).

In a following step E13 of obtaining the sensitive cryptographic key, the user device regenerates its sensitive cryptographic key sk by applying the decryption algorithm corresponding to the encryption algorithm used in step E01, in this case AES, to the ciphertext of the cryptographic key c and to the second cryptographic key k that it regenerated in the previous step E12. In other words, it calculates: sk=AESDec(k,c).

In an optional checking step E14, the user device verifies the integrity of the regenerated sensitive cryptographic key sk by way of the associated public key pk by verifying that the public key pk is actually associated with the sensitive cryptographic key sk by way of the PKGen key generation algorithm. To this end, the user device checks the following equality: pk=PKGen(sk).

In one particular embodiment, when the user's sensitive cryptographic key is used in a secret key encryption system, in step E11, the server S sends the ciphertext of the sensitive cryptographic key c and optionally the ciphertext c̃ to the user device. In step E14, the user device verifies the integrity of the regenerated sensitive cryptographic key sk. More precisely, the user device determines a deterministic ciphertext c̃' of the identifier login using the sensitive cryptographic key sk, denoted c̃'=DetEnc(sk, login) and verifies that this ciphertext c̃' is actually the same as the ciphertext c̃ received from server S.

At the end of this phase P1, the user device may use its sensitive cryptographic key sk to decrypt sensitive data that it has stored in encrypted form.

Figure 1C:
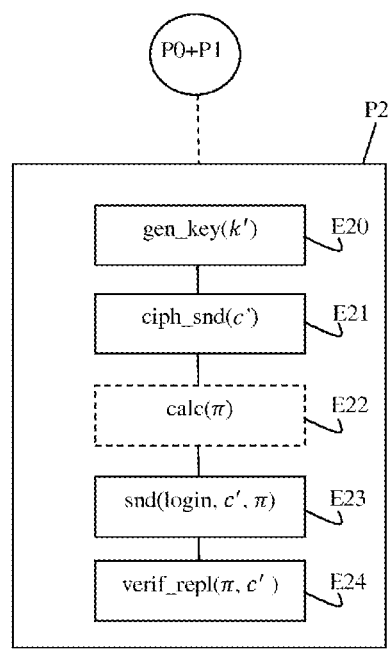

In a phase P2 of changing the password, illustrated by FIG. 1c and independent of the phase P1 of recovering the user's sensitive cryptographic key, the user wishes to change his password pwd. For example, this password has been compromised, or the user has been asked to change this password after a predetermined period. It should be noted that the phase of changing the password may of course only be implemented after the registration phase P0. The user wishes to change his password pwd to a new password, denoted pwd'.

To this end, the user first recovers his sensitive cryptographic key sk. He implements steps E10 to E14 of phase P1 of recovering the sensitive cryptographic key, as described above.

In a step E20 of generating a third cryptographic key, similar to step E00 described above, the user device generates a third cryptographic key k' by way of his new password pwd'. To this end, it applies the same key derivation algorithm as the one used in step E00, in this case PBKDF2, to his identifier login and to his new password pwd'. It thus calculates: k'=PBKDF2(login∥pwd').

In a following step E21 of encrypting the sensitive cryptographic key, similar to step E01 described above, the user device encrypts his sensitive cryptographic key sk by way of the third cryptographic key k' generated in previous step E20 using the same encryption algorithm as the one used in step E01. The user device thus calculates a new ciphertext of the sensitive cryptographic key sk, denoted c', as follows: c'=AESEnc(k', sk). The user device also implements step E03 of the registration phase P0, described above, in order to update the ciphertexts $c_i$' on the basis of the new password pwd'. It is recalled that $c_i$'=AESEnc($k_i$, pwd').

In a following step E22 of proving knowledge of the sensitive cryptographic key sk, the user device calculates a non-interactive zero disclosure proof of knowledge π of the sensitive cryptographic key sk with an integrity check on the new ciphertext c' of the sensitive cryptographic key sk. The proof of knowledge π is intended to guarantee to the server S that the user device knows the sensitive cryptographic key sk. This verification is a prerequisite for replacing the ciphertext c of the sensitive cryptographic key sk with the new ciphertext c' of this same sensitive cryptographic key in the storage memory of the server S.

In one exemplary embodiment, the NIZK ("non-interactive zero-knowledge proof of knowledge") proof of knowledge π is based on the EL Gamal public key encryption scheme. With such a scheme, the private key sk is in the form sk=x, x∈$Z_p^*$, p being a prime number, and the associated public key is in the form pk=y=$g^x$, g∈G, G being a prime order group p. The NIZK proof of knowledge π may be created using the Schnorr signature, r∈$Z_p^*$, t=$g^r$, d=H(y∥t∥c'), where H is a hash function, and s=r−cx (mod p), and the NIZK proof of knowledge π=(d,s). It may be verified by testing whether d=H(y∥$y^d g^s$∥c').

In a following sending step E23, the user device sends its identifier login, the new ciphertext c' of the sensitive cryptographic key sk, the new ciphertexts $c_i$' of the password pwd' and the proof of knowledge π calculated in step E22 to the server S.

In a following verification and replacement step E24, the server S verifies the proof of knowledge π and, if it is correct, the server S replaces the ciphertext c of the sensitive cryptographic key sk in its storage memory with the new ciphertext c' of this same key and the new ciphertexts $c_i$' in association with the identifier login.

In one particular embodiment, when the user's sensitive cryptographic key is used in a secret key encryption system, in step E22, the user device calculates a non-interactive zero disclosure proof of knowledge π of the sensitive cryptographic key sk with an integrity check on the new ciphertext c' of the sensitive cryptographic key sk. In one exemplary embodiment, the NIZK proof of knowledge π is based on the ciphertext c̃=DetEnc(sk, login). It is then necessary to use deterministic encryption with an algebraic structure to be effective. Examples of this type of encryption are described in the article "On notions of Security for Deterministic Encryption, and Efficient Constructions with Random Oracles" by A. Boldyreva, S. Fehr and A. O'Neill published in the CRYPTO 2008 conference proceedings.

The password pwd is thus changed to a new password pwd', the new ciphertext c' of the sensitive cryptographic key sk calculated by way of the third cryptographic key k' derived from the new password pwd', the new ciphertexts $c_i$' are stored by the server S without the latter having access at any time to the user's sensitive cryptographic key sk. The server is therefore not able to access the user's data in open form at any time.

The user device may then implement the above-described recovery phase P1 in order to recover the sensitive cryptographic key sk from the new password pwd' and use it to access its data in open form.

Figure 1D:
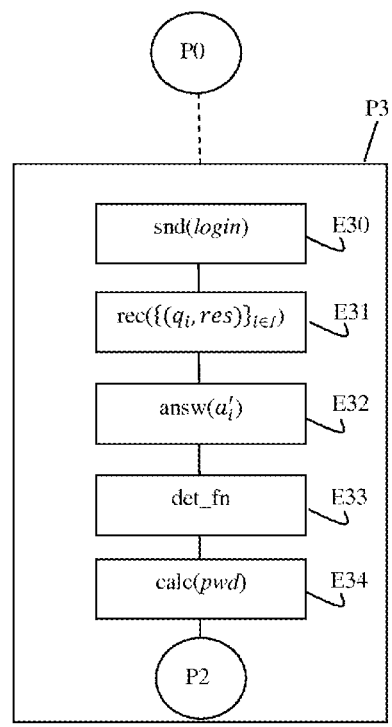

In a phase P3 of managing password loss, illustrated by FIG. 1d and independent of the above-described phase P1 of recovering the user's sensitive cryptographic key and of the above-described phase P2 of changing the password, the user who has forgotten or lost his password wishes to recover his sensitive cryptographic key sk in order to access his encrypted stored data. It should be noted that phase P3 of managing password loss may of course only be implemented after the registration phase P0.

In a step E30 of sending an identifier, the user device sends its identifier login to the server S.

In a following selection and sending step E31, the server S randomly extracts n questions, n≤l, from the set of l personal questions $q_i$ associated with user. I denotes all of the indices associated with the n questions. The server S then sends a subset comprising the n extracted questions $q_i$ and the n ciphertexts $c_i$ of the password pwd to the user device (it is recalled that these ciphertexts were obtained in step E03 by way of the keys $k_i$ associated with the questions $q_i$ and with the answers $a_i$ calculated in step E02). The server S thus sends the subset denoted $\{(q_i, c_i)\}_{i \in I}$ to the user. It is emphasized here that, in this first embodiment, this subset may comprise only one question and the ciphertext of the associated password.

In a question and answer step E32, each of the questions $q_i$ of the subset $\{(q_i, c_i)\}_{i \in I}$ is asked to the user, and the user enters an associated answer $a'_i$ for each question $q_i$ by way of a human-machine interface of the user device.

In a following calculation step E33, a subset of cryptographic keys $k'_i$, i∈I, is calculated on the basis of each question $q_i$ and of each answer $a'_i$ provided by the user in the previous step, each key $k'_i$ of this subset being associated with the question $q_i$ using the same key generation algorithm as the one used in step E02. The key associated with the ith question $q_i$ and with the associated answer $a'_i$ is denoted $k'_i$. Thus, for each i∈I $k'_i$=PBKDF2(login||$q_i$||$a'_i$). In the variant described above, for each i∈I $k'_i$=PBKDF2(login||$a'_i$).

In a following step E34 of recovering the password, a current password, denoted $pwd_i$, is calculated for each i∈I, by decrypting the n ciphertexts $c_i$ of the password pwd by way of the previously calculated keys $k'_i$. It is recalled that, in the registration phase P0, more precisely in the encryption and sending step E03, the user's password pwd was encrypted by the user device by way of each of the keys $k_i$ associated with the answers $a_i$ and, where applicable, with the corresponding questions $q_i$ and that the ciphertexts $c_i$ thus obtained were then sent to the server S. The decryption algorithm corresponding to the encryption algorithm used in step E03 is used. Thus, for i∈I, $pwd_i$=AESDec($k'_i$, $c_i$) is calculated. It is understood that if the user did not make any mistakes in any of the answers $a'_i$, that is to say when $a'_i$=$a_i$, then all of the passwords pwd are identical, and correspond to the user's password pwd.

The user device temporarily stores the recovered password pwd and uses it to implement the steps of phase P2 of changing the password. Specifically, it is advisable to change this previously forgotten password. In one exemplary embodiment, all of the previously calculated passwords $pwd_i$ are identical to the password pwd that the user has forgotten. This means that the user has not made any mistakes in any of the answers $a'_i$ that he provided in step E32.

In a second exemplary embodiment, corresponding to a case in which the user has provided some incorrect answers $a'_i$, then the user memorizes, as recovered password pwd, the one that appears the greatest number of times in recovery step E34.

The ciphertext or ciphertexts that were provided to the management device in step E03 thus allow the user device to determine the password when it has n answer(s) to n question(s).

In one exemplary embodiment, a third party may know, either by chance or by knowing details about the user's life via a social network for example, one or more of the answers $a_i$ to the questions $q_i$. In this case, the third party may implement the steps of phase P3 of managing password loss and try all of the passwords $pwd_i$ that are recovered in step E34 until finding a password $pwd_i$ that corresponds to the user's password pwd. The third party could then obtain the user's sensitive cryptographic key sk and access his data in open form. In order to mitigate such an attack, it is possible to force the user to answer all of the questions that are asked in the event of a password loss.

In a second particular embodiment, in the initial registration phase P0, the steps E00 of key generation of a second cryptographic key k, E01 of the user device encrypting the user's sensitive cryptographic key sk by way of the second cryptographic key k generated in the previous step E00 are executed. In one variant, step E01' is also implemented.

It is assumed that the server S has sent an integer n, n being greater than or equal to two, to the user device, for example with the personal questions $q_i$.

In step E02, the user device chooses an (n−1)th-degree polynomial P such that P(0)=pwd and calculates the value $p_i$=P($a_i$) for each answer $a_i$. Thus, in this second embodiment, the result corresponds to the application of the polynomial P to at least one answer associated with a question.

In step E03, the user device sends the values $p_i$ calculated for each i∈[1,l] to the server S for storage in association with the user's identifier login. In this second embodiment, the result is sent directly to the server S.

Thus, at the end of steps E00 to E03, in this second embodiment, the server S stores, in association with the user's identifier login, the ciphertext c of the user's sensitive cryptographic key sk, the values $p_i$ obtained by applying the polynomial P to the answers $a_i$ and optionally the public key pk or the ciphertext c̃ according to the exemplary embodiments. The values $p_i$, as described later on, allow the user device to determine the password based on an answer to a question asked to the user.

As described above, the ciphertext of the sensitive cryptographic key c and the values $p_i$ obtained by applying the polynomial P to the answers $a_i$ are sent to the server S in two different steps (E01 and E03) for storage in association with the user's identifier login. It is understood that this is merely an exemplary embodiment and that the user device may also send the ciphertext of the sensitive cryptographic key c and the values $p_i$ to the server S in one go in step E03 for storage in association with the user's identifier login.

The phase P1 of recovering the cryptographic key is unchanged in this second embodiment.

The phase P2 of changing the password will now be described in this second embodiment. The user wishes to change his password pwd to a new password, denoted pwd'.

To this end, the user first recovers his sensitive cryptographic key sk. He implements steps E10 to E14 of phase P1 of recovering the cryptographic key, as described above.

Step E20 of generating a third cryptographic key, described above with reference to the first embodiment, is executed in order to generate a third cryptographic key k' by way of the new password pwd'. Step E21, described above with reference to the first embodiment, is also executed in order to encrypt the sensitive cryptographic key sk by way of the third cryptographic key k', that is to say the new ciphertext c'. Step E22, described above with reference to the first embodiment, is executed in order to calculate a non-interactive zero disclosure proof of knowledge π of the sensitive cryptographic key sk with an integrity check on the new ciphertext c' of the sensitive cryptographic key sk.

Sending step E23, described above with reference to the first embodiment, is executed in order to send the identifier login, the new ciphertext c' of the sensitive cryptographic key sk and the proof of knowledge π calculated in step E22 to the server S.

The server S executes step E24 in order to verify the proof of knowledge π.

If the proof of knowledge is correct, the server S sends a set of l questions $q_i$ for each i∈[1, l] to the user device.

As described above for step E02 of this second embodiment, the user device chooses an (n−1)th-degree polynomial P' such that P'(0)=pwd' and calculates the value $p_i'=P'(a_i)$ for each answer $a_i$.

As described above for step E03 of this second embodiment, the user device sends the values $p_i'$ calculated for each i∈[1, l] to the server to replace the previous values $p_i$ in its storage memory. The server S thus stores the new ciphertext c' of the sensitive cryptographic key sk and the new values $p_i'$ in association with the user's identifier login.

The variants described above with reference to the first embodiment for this phase P2 of changing the password are also applicable.

The password pwd is thus changed to a new password pwd'; the new ciphertext c' of the sensitive cryptographic key sk calculated by way of the third cryptographic key k' derived from the new password pwd' and the new ciphertexts $c_i$ are stored by the server S without the latter having access at any time to the user's sensitive cryptographic key sk. The server is therefore not able to access the user's data in plaintext at any time.

The phase P3 of managing password loss will now be described in this second embodiment. The user has forgotten or lost his password and wishes to recover his sensitive cryptographic key sk in order to access his encrypted stored data.

Step E30 is executed by the user device in order to send its identifier login to the server S.

Step E31 is executed by the server S in order to randomly extract n questions, n≤l, from the set of l personal questions $q_i$ associated with the user and in order to send a subset comprising the n extracted questions $q_i$ and the n values $p_i$ to the user device (it is recalled that these values were obtained in step E03 of the second embodiment by way of a polynomial P and are each associated with an answer $a_i$). The server S thus sends the set denoted $\{(q_i, p_i)\}$ for i∈I to the user.

In question and answer step E32, each of the questions $q_i$ of the subset is asked to the user, and the user enters an associated answer $a_i'$ for each question $q_i$ by way of a human-machine interface of the user device.

In calculation step E33, the user device determines the polynomial P from the n obtained responses $a_i'$ and the n associated values $p_i$ for example by executing a Lagrange interpolation.

In step E34, the user device calculates P(0) in order to obtain the password pwd.

The user device temporarily stores the recovered password pwd and uses it to implement the steps of phase P2 of changing the password.

The value or values that were provided to the server S in step E03 thus allow the user device to determine the password when it has n answers to the n questions.

In a third particular embodiment, in the initial registration phase P0, the steps E00 of key generation of a second cryptographic key k, E01 of the user device encrypting the user's sensitive cryptographic key sk by way of the second cryptographic key k generated in the previous step E00 are executed. In one variant, step E01' is also implemented.

It is assumed that the server S has sent an integer n to the user device, for example with the personal questions $q_i$.

In step E02, the user device chooses a bijective (n−1)th-degree polynomial P. By way of illustrative example, when n has a value of two, the polynomial is first-degree and is always bijective. For higher-degree polynomials, restrictions on the input domain and/or on the output domain may make it possible to achieve the same goal.

Still in step E02, the user device calculates the value $p_i=P(a_i)$ and $p_0=P(pwd)$ for each answer $a_i$. Thus, in this third embodiment, the result corresponds to the application of the polynomial P to at least one answer associated with a question.

In step E03, the user device sends the values $p_i$ calculated for each i∈[1, l] and the value $p_0$ to the server S for storage in association with the user's identifier login. In this third embodiment, the result is sent directly to the server S.

Thus, at the end of steps E00 to E03, in this third embodiment, the server S stores, in association with the user's identifier login, the ciphertext c of the user's sensitive cryptographic key sk, the values $p_i$ obtained by applying the polynomial P to the answers $a_i$, the value $p_0$ and optionally the public key pk or the ciphertext c̃ according to the exemplary embodiments. The values $p_i$, as described later on, allow the user device to determine the password based on n answers to n questions asked to the user.

As described above, the ciphertext of the sensitive cryptographic key c, the value $p_0$ and the values $p_i$ obtained by applying the polynomial P to the answers $a_i$ are sent to the server S in two different steps (E01 and E03) for storage in association with the user's identifier login. It is understood that this is merely an exemplary embodiment and that the user device may also send the ciphertext of the sensitive cryptographic key c, the value $p_0$ and the values $p_i$ to the server S in one go in step E03 for storage in association with the user's identifier login.

The phase P1 of recovering the cryptographic key is unchanged in this third embodiment.

The phase P2 of changing the password will now be described in this third embodiment. The user wishes to change his password pwd to a new password, denoted pwd'.

To this end, the user first recovers his sensitive cryptographic key sk. He implements steps E10 to E14 of phase P1 of recovering the sensitive cryptographic key, as described above.

Step E20 of generating a third cryptographic key, described above with reference to the first embodiment, is executed in order to generate a third cryptographic key k' by way of the new password pwd'. Step E21, described above with reference to the first embodiment, is also executed in order to encrypt the sensitive cryptographic key sk by way of the third cryptographic key k', that is to say the new ciphertext c'. Step E22, described above with reference to the first embodiment, is executed in order to calculate a non-interactive zero disclosure proof of knowledge π of the sensitive cryptographic key sk with an integrity check on the new ciphertext c' of the sensitive cryptographic key sk.

The server S sends a set l of questions $q_i$ for each i∈[1,l] to the user device.

Each of the questions $q_i$ is asked to the user, and the user enters an associated answer $a_i'$ for each question $q_i$ by way of a human-machine interface of the user device. The user device then determines the polynomial P by interpolation, based on the values $p_0$, $p_i$ and the answers $a_i'$.

The user device then determines the value taken for the password pwd', denoted $p_0'$, based on the polynomial P.

Sending step E23, described above with reference to the first embodiment, is executed in order to send the identifier login, the new ciphertext c' of the sensitive cryptographic key k, the proof of knowledge π calculated in step E22 and the value $p_0'$ to the server S.

The server S executes step E24 in order to verify the proof of knowledge π.

If the proof of knowledge is correct, the server S thus stores the new ciphertext c' of the sensitive cryptographic key sk and the new value $p_0'$ in association with the user's identifier login.

The variants described above with reference to the first embodiment for this phase P2 of changing the password are also applicable.

The password pwd is thus changed to a new password pwd'; the new ciphertext c' of the sensitive cryptographic key sk calculated by way of the third cryptographic key k' derived from the new password pwd' and the new value $p_0'$ are stored by the server S without the latter having access at any time to the user's sensitive cryptographic key sk. The server is therefore not able to access the user's data in open form at any time. It is emphasized here that the values $p_i$ are not changed during this password change.

The phase P3 of managing password loss will now be described in this third embodiment. The user has forgotten or lost his password and wishes to recover his sensitive cryptographic key sk in order to access his encrypted stored data in plaintext.

Step E30 is executed by the user device in order to send its identifier login to the server S.

Step E31 is executed by the server S in order to randomly extract n questions, n≤l, from the set of l personal questions $q_i$ associated with the user and in order to send a subset comprising the n extracted questions $q_i$ and the n values $p_i$ to the user device (it is recalled that these values were obtained in step E03 of the third embodiment by way of a polynomial P and are each associated with an answer $a_i$) and the value $p_0$. The server S thus sends the set denoted $\{(q_i,p_i)\}$ for i∈I and $p_0$ to the user.

In question and answer step E32, each of the questions $q_i$ of the subset is asked to the user, and the user enters an associated answer $a'_i$ for each question $q_i$ by way of a human-machine interface of the user device.

In calculation step E33, the user device determines the polynomial P from the n obtained responses $a_i'$ and the n associated values $p_i$, for example by executing a polynomial interpolation.

In step E34, the user device calculates $P^{-1}(p_0)$ in order to obtain the password pwd, where $P^{-1}$ corresponds to the inverse function of the polynomial P.

The user device temporarily stores the recovered password pwd and uses it to implement the steps of phase P2 of changing the password.

The value or values that were provided to the server S in step E03 thus allow the user device to determine the password when it has n answers to n questions.

In the embodiments that have been described, the management device is a server S. Any storage device, such as a security element, may also implement steps of the protection method as described above.

Figure 2:
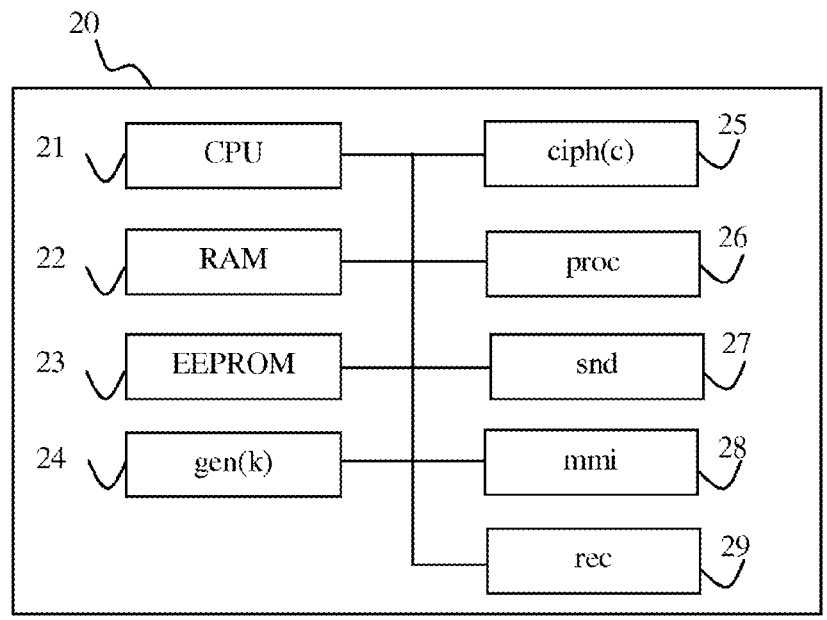
FIG. 2 is a schematic depiction of a user device able to implement steps of the method for protecting a cryptographic key by way of a user password, according to one exemplary embodiment.

A user device 20 able to implement some of the steps of the method for protecting a cryptographic key by way of a user password, according to one exemplary embodiment, will now be described with reference to FIG. 2. This user device 20 is intended to be used by a user having an identifier and an associated password. A cryptographic key is intended to decrypt at least one ciphertext. The user device comprises:

a processing unit 21, or CPU ("central processing unit"), designed to execute code instructions;

a set of memories, including a volatile memory 22 of RAM ("random access memory") type, used to execute code instructions, store variables, etc., and a storage memory 23 of flash memory or EEPROM ("electronically erasable programmable read-only memory") type. The storage memory 23 is designed to store data and applications. In particular, the storage memory 23 stores a software module for protecting a sensitive cryptographic key by way of a user password designed to implement the steps of the method for protecting a cryptographic key described above that are implemented by the user device.

The user device 20 also comprises:

a module 24 for generating a second cryptographic key by applying a key derivation algorithm to at least the password;

a module 25 for encrypting the sensitive cryptographic key by applying an encryption algorithm parameterized by the second cryptographic key;

a calculation module 26, designed to calculate a result of the application of a function to at least one answer associated with a question, the answer being obtained from the user;

a provision module 27, in particular designed to provide data in association with an identifier to the management device for storage. These data correspond to the ciphertext of the cryptographic key and at least one value dependent on the result, this value allowing the user device to determine the password when it has the answer to said question;

a human-machine interface module 28, designed to communicate with a user;

an obtainment module 29, designed to obtain data from the management device. These data may correspond to a set of questions $q_i$, a question having an associated answer $a_i$ intended to be provided by the user, these questions being obtained in a phase of the user registering with the management device or in a phase of password loss management by the user device. These data may also correspond to the data that were provided beforehand by the user device to the management device for storage in association with the user's identifier.

In one particular embodiment, the provision module 27 is a sending module and the obtainment module 29 is a reception module.

In the first embodiment, the provided value corresponds to a ciphertext $c_i$ of the user's password pwd, the user's password having been encrypted by way of a cryptographic key associated with an answer to a question, and where applicable, the corresponding question.

In the second and third embodiments, the provided value corresponds to an application of a polynomial P to at least one answer associated with a question.

The protection technique is implemented by way of software components and/or hardware components. In this regard, the term "module" may correspond in this document equally to a software component, to a hardware component or to a set of hardware and/or software components, able to implement a function or a set of functions, according to what is described above in respect of the module in question.

A software component corresponds to one or more computer programs, one or more subroutines of a program, or more generally to any element of a program or of software. Such a software component is stored in memory and then loaded and executed by a data processor of a physical entity, and is able to access the hardware resources of this physical entity (memories, recording media, communication buses, electronic input/output cards, user interfaces, etc.).

In the same way, a hardware component corresponds to any element of a hardware assembly. It may be a programmable or non-programmable hardware component, with or without an integrated processor for executing software. It is for example an integrated circuit, a chip card, an electronic card for executing firmware, etc.

In one particular embodiment, the generation module 24, encryption module 25, calculation module 26, obtainment module 29 and provision module 27 are software modules comprising software instructions for implementing those steps of the method for protecting a cryptographic key by way of a password, as described above, that are executed by the user device.

The invention therefore also relates to:
- a computer program comprising program instructions intended to command the execution of those steps of the method for protecting a cryptographic key by way of a password, as described above, that are implemented by a user device when this program is executed by a processor of the user device, and
- a readable recording medium on which the above-described computer program is recorded.

The software modules may be stored in or transmitted by a data medium. This may be a hardware storage medium, for example a CD-ROM, a floppy disk or a hard disk, or else a transmission medium such as an electrical, optical or radio signal, or a telecommunication network.

Figure 3:
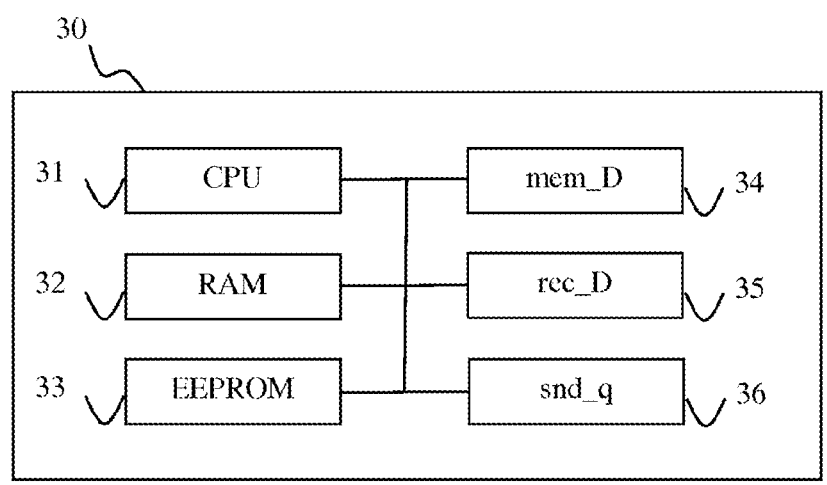
FIG. 3 is a schematic depiction of a management device able to implement steps of the method for protecting a cryptographic key by way of a user password, according to one exemplary embodiment.

A management device 30 designed to implement some of the steps of the method for protecting a cryptographic key by way of a user password, according to one exemplary embodiment, will now be described with reference to FIG. 3.

The management device 30 is a computer device that conventionally comprises:
- a processing unit 31, or CPU, designed to execute code instructions;
- a set of memories, including a volatile memory 32 of RAM type, used to execute code instructions, to store variables, etc., and a storage memory 33 of flash memory or EEPROM type. The storage memory 33 is designed to store data and applications. In particular, the storage memory 33 stores a software module for protecting a cryptographic key by way of a user password designed to implement the steps of the method for protecting a cryptographic key described above that are implemented by the management device.

The management device also comprises:
- an obtainment module 35, designed in particular to obtain data to be stored in association with an identifier of a user from a user device. These data correspond in particular to the ciphertext of a cryptographic key c, sent by the user device in step E01 of the above-described protection method, and to a value dependent on a result calculated by the user device, this value allowing the user device to determine the password when it has the answer to a question;
- a provision module 36, designed to provide data to a user device. These data may correspond to a set of questions $q_i$, a question having an associated answer $a_i$ intended to be provided by the user, these questions being provided in a phase of the user registering with the management device or in a phase of password loss management by the user device. These data may also correspond to the data that were obtained beforehand from the user device by the management device for storage in association with the user's identifier.
- a storage memory 34, designed to store the data received from a registered user device.

In one particular embodiment, the obtainment module 35 is a reception module and the provision module 36 is a sending module.

In the first embodiment, the received value corresponds to a ciphertext $c_i$ of the user's password pwd, the user's password having been encrypted by way of a cryptographic key associated with an answer to a question, and where applicable, the corresponding question.

In the second and third embodiments, the received value corresponds to an application of a polynomial P to at least one answer associated with a question.

In one particular embodiment, the obtainment module 35 and the provision module 36 are software modules comprising software instructions for implementing those steps of the method for protecting a cryptographic key by way of a password, as described above, that are executed by the management device.

The invention therefore also relates to:
- a computer program comprising program instructions intended to command the execution of those steps of the method for protecting a cryptographic key by way of a password, as described above, that are implemented by a management device when this program is executed by a processor of the management device, and
- a readable recording medium on which the above-described computer program is recorded.

The invention also relates to a system for protecting a cryptographic key by way of a user password. Such a system comprises:
- a management device as described above, and
- a user device as described above.

Although the present disclosure has been described with reference to one or more examples, workers skilled in the art will recognize that changes may be made in form and detail without departing from the scope of the disclosure and/or the appended claims.

The invention claimed is:

1. A protection method for protecting a first cryptographic key, a user having an identifier and an associated password provided by the user, said first cryptographic key being intended to decrypt at least one ciphertext, said method, implemented by a user device, comprising:
  generating a second cryptographic key by applying a key derivation algorithm to at least the password;
  encrypting the first cryptographic key by applying an encryption algorithm parameterized by the second cryptographic key;
  calculating a result of an application of a function to at least one answer associated with a question, the answer being obtained from the user; and
  providing to a management device for storage:
    the ciphertext of said first cryptographic key; and
    at least one value dependent on said result of the application of the function to at least one answer associated with the question, wherein said value provided by the user device to the management device for storage allows the user device to retrieve the password provided by the user when the user device has the answer to said question.

2. The protection method as claimed in claim 1, wherein the result corresponds to a third cryptographic key generated by applying a key derivation algorithm to said answer and the value dependent on said result corresponds to an encryption of the password by way of the generated third cryptographic key.

3. The protection method as claimed in claim 2, comprising, in order to determine the password from an answer obtained by the user device for said question:
the user device obtaining said ciphertext of the password and the corresponding question;
calculating a fourth cryptographic key by applying the key derivation algorithm to the question and to the answer obtained from the user;
calculating a current password by applying the decryption algorithm corresponding to the encryption algorithm parameterized by the calculated fourth cryptographic key to the ciphertext of the obtained password.

4. The protection method as claimed in claim 1, wherein the function is an (n−1)th-degree polynomial, n being greater than or equal to two, n corresponding to a number of questions to be asked to the user in order to determine the password, said polynomial taking the value of the password at zero and the value dependent on said result corresponds to said result.

5. The protection method as claimed in claim 1, wherein the function is a bijective (n−1)th-degree polynomial, n being greater than or equal to two, n corresponding to a number of questions to be asked to the user in order to determine the password, the value dependent on said result corresponds to said result and the user device furthermore provides the result of the application of the function to the password to the management device for storage.

6. The protection method as claimed in claim 1, furthermore comprising:
the user device obtaining the ciphertext of the first cryptographic key from the management device;
the user device regenerating the second cryptographic key by applying the key derivation algorithm to at least the password provided by the user; and
regenerating the first cryptographic key by applying the decryption algorithm corresponding to the encryption algorithm parameterized by the second cryptographic key to the ciphertext of the first cryptographic key.

7. The protection method as claimed in claim 6, comprising verifying integrity of the regenerated first cryptographic key by way of a public key associated with the first cryptographic key stored in association with the ciphertext of said first cryptographic key.

8. The protection method as claimed in claim 6, comprising verifying integrity of the regenerated first cryptographic key by way of a ciphertext of the user's identifier through said first cryptographic key stored in association with the ciphertext of said first cryptographic key.

9. The protection method as claimed in claim 1, comprising, in order to change the password:
the user device generating a fifth cryptographic key by applying the key derivation algorithm to at least one new password;
the user device calculating a new ciphertext of the first cryptographic key by applying the encryption algorithm parameterized by the fifth cryptographic key to the first cryptographic key; and
storing said new ciphertext of the first cryptographic key.

10. The protection method as claimed in claim 9, wherein a proof of knowledge is stored in association with the ciphertext of the first cryptographic key and said proof of knowledge is verified before said new ciphertext of the first cryptographic key is stored.

11. A user device, to be used by a user having an identifier and an associated password provided by the user, a first cryptographic key being configured to decrypt at least one ciphertext, said user device comprising:
a processor; and
at least one non-transitory computer-readable medium comprising instructions stored thereon which when executed by the processor configure the user device to:
generate a second cryptographic key by applying a key derivation algorithm to at least the password;
encrypt the first cryptographic key by applying an encryption algorithm parameterized by the second cryptographic key;
calculate a result of an application of a function to at least one answer associated with a question, the answer being obtained from the user; and
provide to a management device for storage:
the ciphertext of said first cryptographic key; and
at least one value dependent on said result of the application of the function to at least one answer associated with the question, wherein said value provided by the user device to the management device for storage allows the user device to retrieve the password provided by the user when the user device has the answer to said question.

12. A management device comprising:
a processor; and
at least one non-transitory computer-readable medium comprising instructions stored thereon which when executed by the processor configure the management device to:
obtain from a user device:
a ciphertext of a first cryptographic key; and
a value dependent on a result calculated by the user device for storage in association with an identifier of a user, wherein this value provided by the user device to the management device for storage allows the user device to retrieve a password provided by the user when the user device has the answer to a question; and
store the ciphertext of the first cryptographic key and the value obtained from the user device in the at least one non-transitory computer-readable medium in association with the identifier of the user.

13. The user device as claimed in claim 11, wherein the result corresponds to a third cryptographic key generated by applying a key derivation algorithm to said answer and the value dependent on said result corresponds to an encryption of the password by way of the generated third cryptographic key.

14. The user device as claimed in claim 13, comprising, in order to determine the password from an answer obtained by the user device for said question:
the user device obtaining said ciphertext of the password and the corresponding question;
calculating a fourth cryptographic key by applying the key derivation algorithm to the question and to the answer obtained from the user;
calculating a current password by applying the decryption algorithm corresponding to the encryption algorithm parameterized by the calculated fourth cryptographic key to the ciphertext of the obtained password.

15. The user device as claimed in claim 11, wherein the function is an (n−1)th-degree polynomial, n being greater than or equal to two, n corresponding to a number of questions to be asked to the user in order to determine the password, said polynomial taking the value of the password at zero and the value dependent on said result corresponds to said result.

16. The user device as claimed in claim 11, wherein the instructions furthermore configure the user device to:
   obtain the ciphertext of the first cryptographic key from the management device;
   regenerate the second cryptographic key by applying the key derivation algorithm to at least the password provided by the user; and
   regenerate the first cryptographic key by applying the decryption algorithm corresponding to the encryption algorithm parameterized by the second cryptographic key to the ciphertext of the first cryptographic key.

17. The user device as claimed in claim 16, wherein the instructions furthermore configure the user device to verify integrity of the regenerated first cryptographic key by way of a public key associated with the first cryptographic key stored in association with the ciphertext of said first cryptographic key.

18. The user device as claimed in claim 16, wherein the instructions furthermore configure the user device to verify integrity of the regenerated first cryptographic key by way of a ciphertext of the user's identifier through said first cryptographic key stored in association with the ciphertext of said first cryptographic key.

19. The user device as claimed in claim 11, wherein the instructions furthermore configure the user device to, in order to change the password:
   generate a fifth cryptographic key by applying the key derivation algorithm to at least one new password;
   calculate a new ciphertext of the first cryptographic key by applying the encryption algorithm parameterized by the fifth cryptographic key to the first cryptographic key; and
   store said new ciphertext of the first cryptographic key.

20. The user device as claimed in claim 19, wherein the instructions furthermore configure the user device to store a proof of knowledge in association with the ciphertext of the first cryptographic key and verify said proof of knowledge before said new ciphertext of the first cryptographic key is stored.

* * * * *